(12) United States Patent
Kim

(10) Patent No.: US 10,768,420 B2
(45) Date of Patent: Sep. 8, 2020

(54) HEAD-UP DISPLAY APPARATUS

(71) Applicant: Hyundai Mobis Co., Ltd., Seoul (KR)

(72) Inventor: Byung Ki Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 123 days.

(21) Appl. No.: 16/182,186

(22) Filed: Nov. 6, 2018

(65) Prior Publication Data

US 2019/0137761 A1 May 9, 2019

(30) Foreign Application Priority Data

Nov. 7, 2017 (KR) .......................... 10-2017-0147162

(51) Int. Cl.
*G02B 27/01* (2006.01)
*G02B 7/182* (2006.01)

(52) U.S. Cl.
CPC ......... *G02B 27/0149* (2013.01); *G02B 7/182* (2013.01); *G02B 2027/0159* (2013.01)

(58) Field of Classification Search
CPC ...... G02B 27/0149; G02B 7/182; G02B 5/10; G02B 2027/0159; G02B 2027/0169
See application file for complete search history.

(56) References Cited

U.S. PATENT DOCUMENTS

2016/0139410 A1* 5/2016 Shin ................... G02B 27/0149
359/631

* cited by examiner

*Primary Examiner* — Wen Huang
(74) *Attorney, Agent, or Firm* — H.C. Park & Associates, PLC

(57) ABSTRACT

A head-up display apparatus may include: a mirror; a housing installed on one side of the mirror; a drive unit installed in the housing; a barrel cam rotatably installed in the housing and coupled to the drive unit so that the barrel cam is rotated by the drive unit, with a cam groove formed in the barrel cam and inclined relative to an axial direction of the barrel cam; and a mirror link coupled to the mirror, and configured to move along the cam groove to rotate the mirror when the barrel cam rotates.

11 Claims, 9 Drawing Sheets

HEAD-UP DISPLAY APPARATUS

CROSS-REFERENCES TO RELATED APPLICATIONS

This application claims priority from and the benefit of Korean Patent Application No. 10-2017-0147162, filed on Nov. 7, 2017, which is hereby incorporated by reference for all purposes as if set forth herein.

BACKGROUND

Field

Exemplary embodiments relate to a head-up display apparatus, and more particularly, a head-up display apparatus capable of finely adjusting a tilting angle of a mirror.

Discussion of the Background

In general, a head-up display apparatus may be installed in an instrument panel for a vehicle. The head-up display apparatus projects an imaginary image in a visible region of is a driver (i.e., on a windshield). The driver may check driving information while keeping eyes forward when driving.

The head-up display apparatus includes a display unit and a mirror. A drive unit is installed on the mirror to make it possible to adjust the angle of the mirror. The mirror is coupled to a driven power transmission unit by a link unit.

However, in the conventional head-up display apparatus, the link unit is installed to make point contact with the driven power transmission unit. Hence, a load may be concentrated on a point contact portion of the link unit by vibrations of the vehicle, acceleration, friction, etc. Therefore, abrasion and deformation in the point contact portion of the link unit are comparatively increased, so that the degree of precision in operation may be reduced, whereby the optical performance may be reduced.

Furthermore, since the drive unit uses a lead screw and a stepping motor to rotate the mirror, an increase in resolving power is limited by difficulties in reducing the pitch of the lead screw or increasing the degree of precision in the rotating angle of the stepping motor.

Therefore, there is a need to improve this configuration.

The background art of the present invention was proposed in Korean Patent Unexamined Publication No. 2011-0010730 (Feb. 7, 2011, entitled "Power transmission apparatus").

The above information disclosed in this Background section is only for enhancement of understanding of the background of the invention and, therefore, it may contain information that does not constitute prior art.

SUMMARY

Exemplary embodiments of the present invention are directed to a head-up display apparatus capable of finely adjusting a tilting angle of a mirror.

In one embodiment, a head-up display apparatus may include: a mirror; a housing installed on one side of the mirror; a drive unit installed in the housing; a barrel cam rotatably installed in the housing and coupled to the drive unit so that the barrel cam is rotated by the drive unit, with a cam groove formed in the barrel cam and inclined relative to an axial direction of the barrel cam; and a mirror link coupled to the mirror, and configured to move along the cam groove to rotate the mirror when the barrel cam rotates.

In an embodiment, an outer side surface of the barrel cam may be formed of a circular curved surface, and the cam groove may be spirally formed in the outer side surface of the barrel cam.

In an embodiment, the cam groove may include: a first profile section configured to adjust a tilting angle of the mirror; and a second profile section coupled to the first profile section, and having an inclination angle greater than an inclination angle of the first profile section.

In an embodiment, a pair of support ribs may be provided on the housing to face respective opposite ends of the barrel cam, and barrel hinges may be provided on the respective opposite ends of the barrel cam and hinged to the corresponding support ribs.

In an embodiment, the drive unit may include: a gear coupled to one end of the barrel cam; and a drive motor coupled to the gear to drive the gear.

In an embodiment, the gear may include: a worm gear axially coupled to the drive motor; and a worm wheel engaging with the worm gear, and installed on the one end of the barrel cam so as to be concentric with a rotating axis of the barrel cam.

In an embodiment, the head-up display apparatus may further include an elastic member coupled to the mirror link unit and configured to apply elastic force to the mirror link unit so that the mirror link unit comes into close contact with the cam groove.

In an embodiment, the elastic member may be coupled to the housing and configured to pull the mirror link unit downward.

In an embodiment, the mirror link unit may include: a link lever protruding from a predetermined portion of the mirror and coupled with the elastic member; and a sliding protrusion protruding from the link lever and coming into line contact with the cam groove.

In an embodiment, the head-up display apparatus may further include a switch installed to sense a rotating position of the mirror link unit.

In an embodiment, the switch may be configured to come into contact with the mirror link unit when the mirror link unit reaches an initial position.

In accordance with an embodiment of the present invention, when a barrel cam rotates, a mirror link unit slides along a cam groove having an inclined shape. Thus, the rotating angle of the mirror link unit may be finely changed. Therefore, the degree of precision of the tilting angle of a mirror may be enhanced, and the resolving power of the mirror may be enhanced. Furthermore, since the resolving power of the mirror is enhanced, the optical performance of a head-up display apparatus may be improved.

In addition, according to an embodiment of the present invention, since the cam groove is spirally formed in an outer side surface of the barrel cam having a circular curved surface, the rotating angle of the mirror link unit relative to the rotating angle of the barrel cam remains constant. Therefore, the rotating angle of the mirror link unit may be precisely adjusted.

Moreover, according to an embodiment of the present invention, since an elastic member applies elastic force to the mirror link unit so that the mirror link unit comes into close contact with the cam groove, the mirror link unit may be prevented from slipping from the cam groove when the barrel cam rotates. Therefore, the rotating angle of the barrel cam may be accurately controlled, whereby the tilting angle of the mirror link unit may be precisely adjusted.

Furthermore, according to an embodiment of the present invention, because a sliding protrusion comes into line contact with the cam groove, a load generated by vibrations of the vehicle, acceleration, friction, etc. may be dispersed to a line contact portion. Therefore, the line contact portion of the mirror link unit may be restricted from being worn or deformed, whereby the degree of precision in operation or the optical performance may be prevented from deteriorating.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Hereinafter, an embodiment of a head-up display apparatus in accordance with the present invention will be described in detail with reference to the accompanying drawings. It should be noted that in the description of the head-up display apparatus, the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
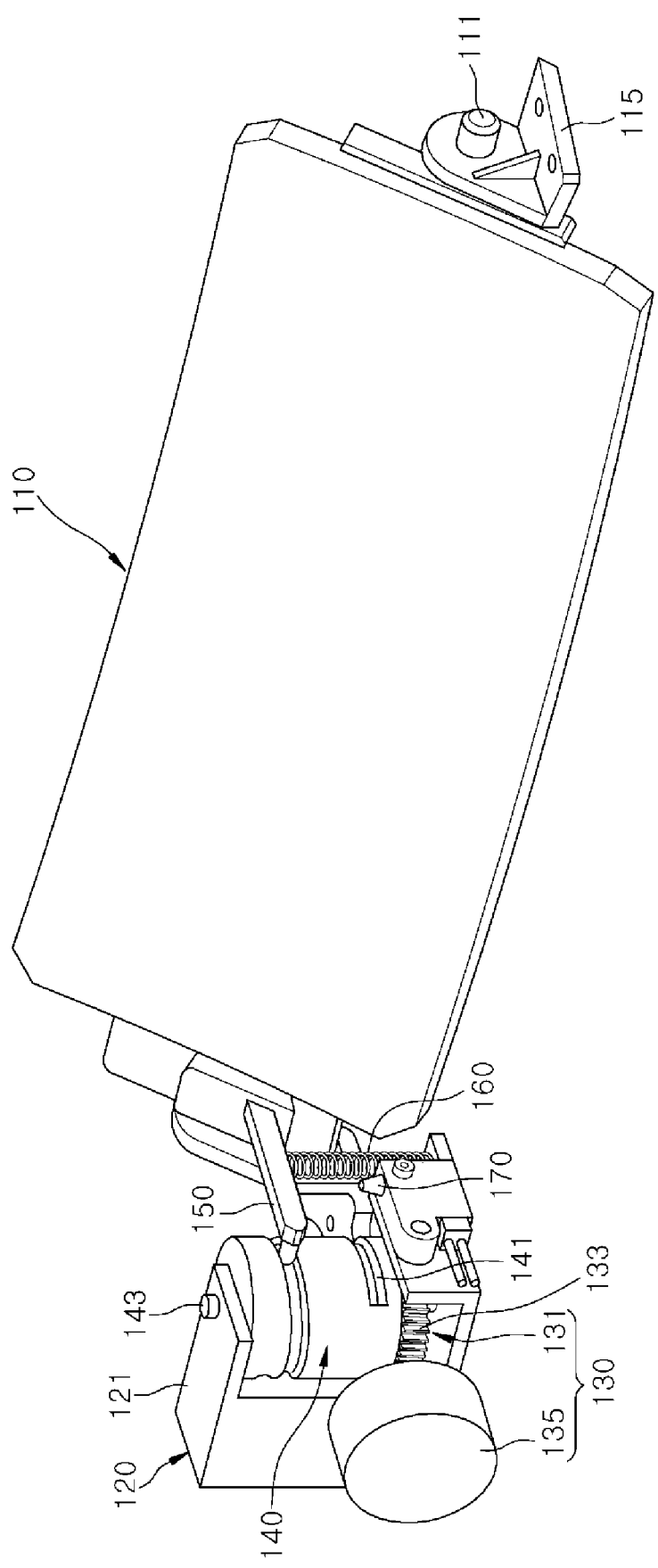
FIG. 1 is a perspective view illustrating a head-up display apparatus in accordance with an embodiment of the present invention.
Figure 2:
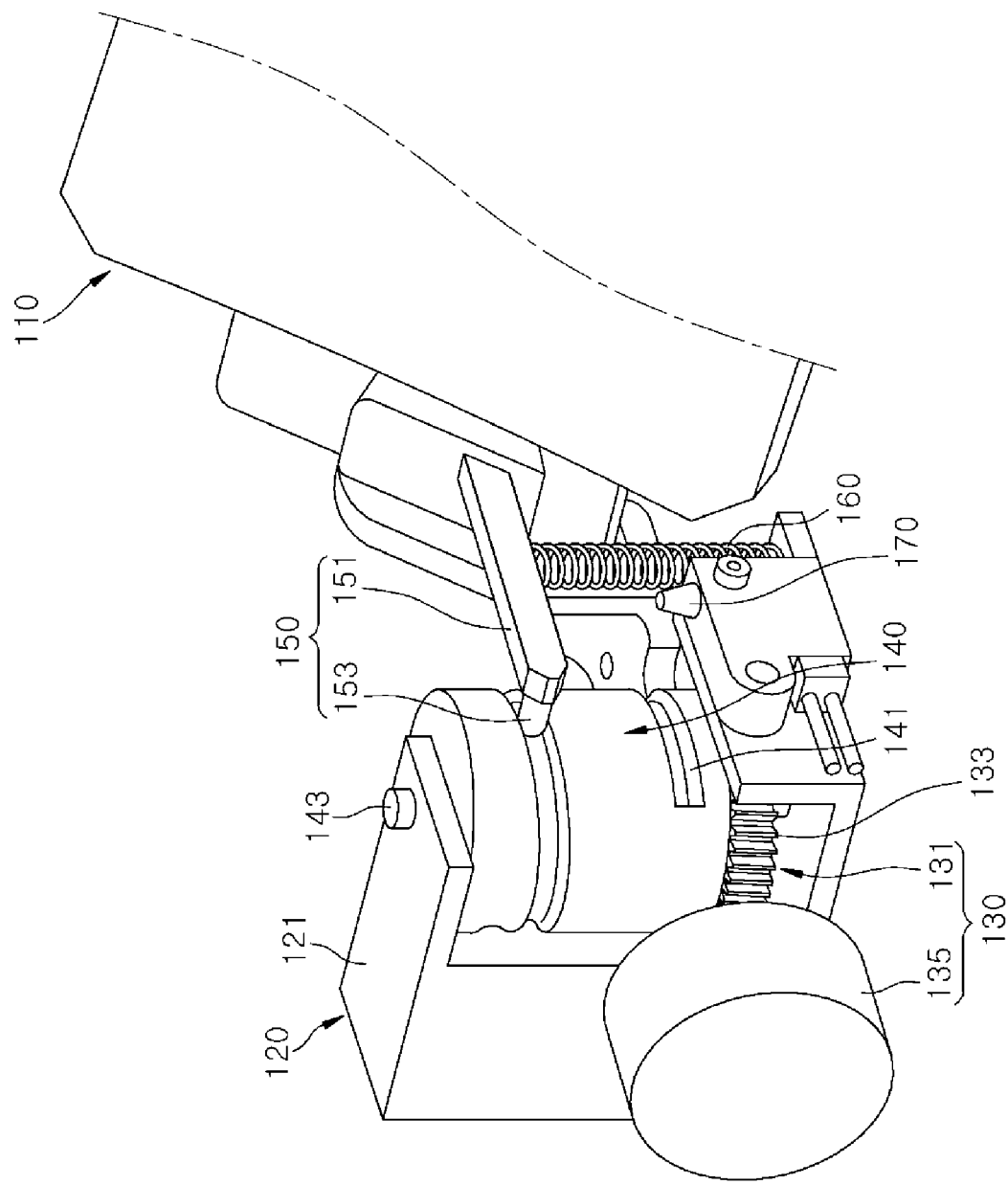
FIG. 2 is an enlarged view illustrating the head-up display apparatus in accordance with the embodiment of the present invention.
Figure 3:
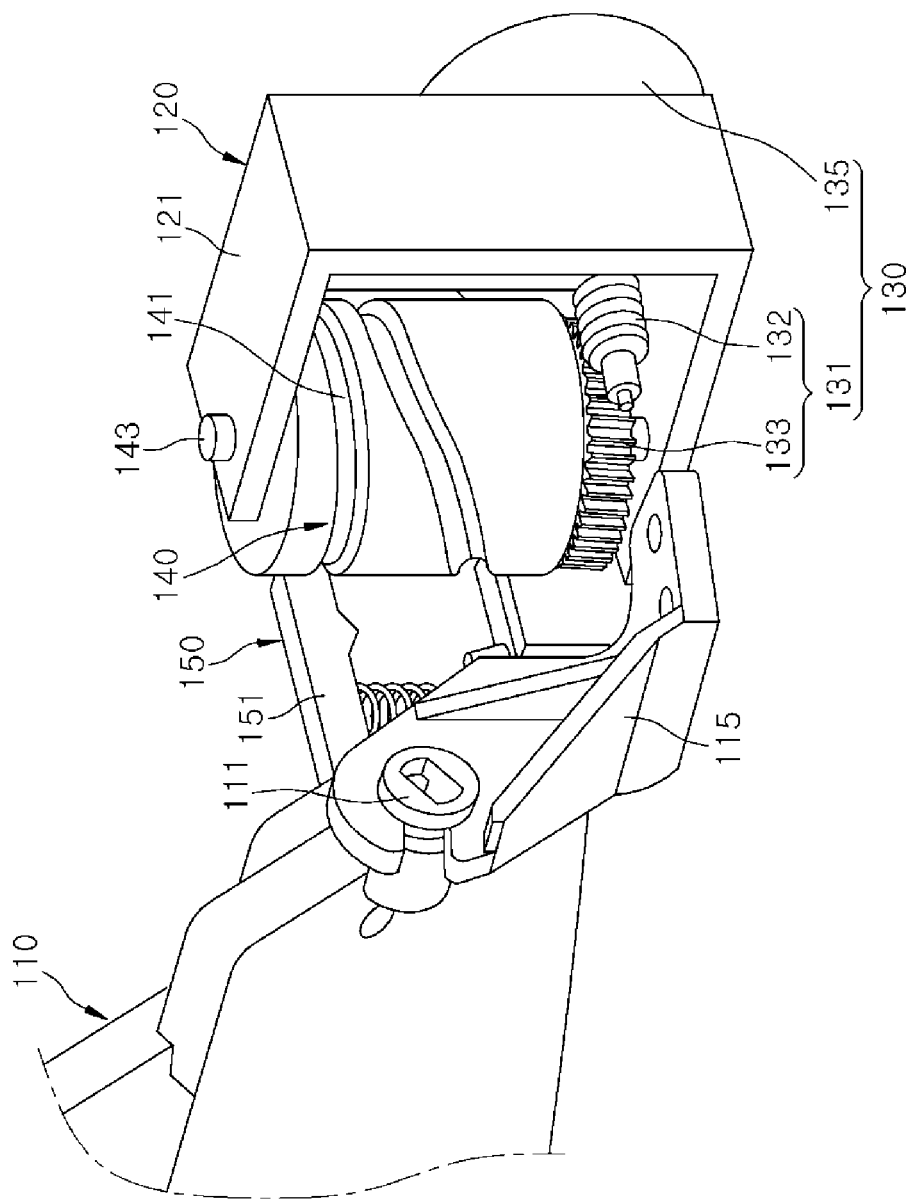
FIG. 3 is an enlarged view illustrating a coupling structure of a barrel cam and a gear of the head-up display apparatus in accordance with the embodiment of the present invention.
Figure 4:
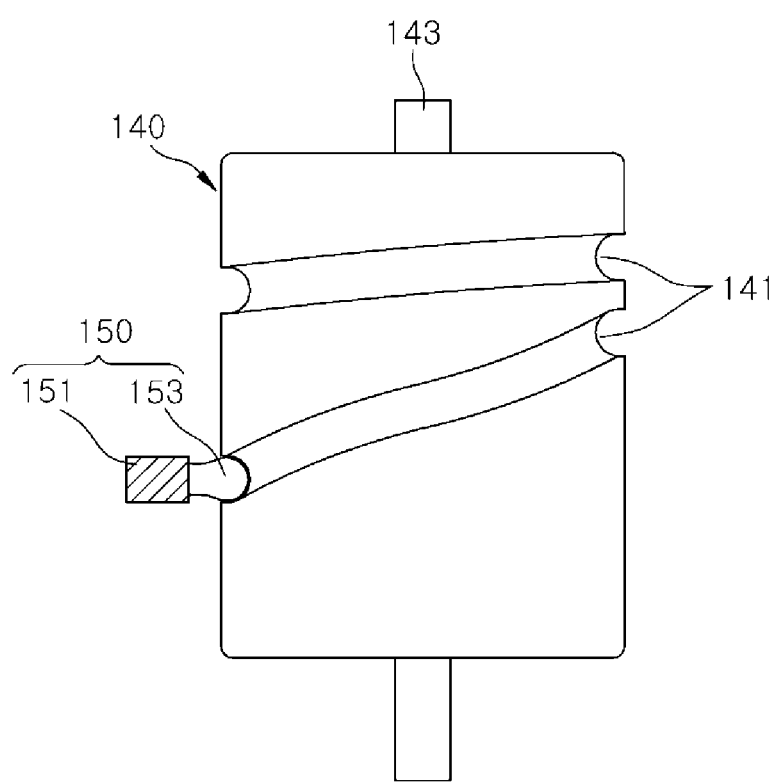
FIG. 4 is an enlarged view illustrating a coupling structure of the barrel cam and a mirror link unit of the head-up display apparatus in accordance with the embodiment of the present invention.

FIG. 1 is a perspective view illustrating a head-up display apparatus in accordance with an embodiment of the present invention. FIG. 2 is an enlarged view illustrating the head-up display apparatus in accordance with the embodiment of the present invention. FIG. 3 is an enlarged view illustrating a coupling structure of a barrel cam and a gear of the head-up display apparatus in accordance with the embodiment of the present invention. FIG. 4 is an enlarged view illustrating a coupling structure of the barrel cam and a mirror link unit of the head-up display apparatus in accordance with the embodiment of the present invention.

Referring to FIGS. 1 to 4, the head-up display apparatus in accordance with the embodiment of the present invention includes a mirror 110, a housing 120, a drive unit 130, a barrel cam 140, and a mirror link 150.

The mirror 110 reflects an image emitted from a display unit (not shown). The mirror 110 may be formed of an aspherical mirror. Mirror hinges 111 protrude from respective opposite ends of the mirror 110, and are rotatably coupled to respective mirror supports 115. Each mirror support 115 has a mirror hinge hole (not shown) into which the corresponding mirror hinge 111 is rotatably inserted. The mirror hinges 111 are disposed on a rotating axis of the mirror 110.

The housing 120 is installed on one side of the mirror 110. Here, the housing 120 is disposed adjacent to the corresponding mirror hinge 111 provided on the one side of the mirror 110.

The drive unit 130 is installed in the housing 120. The drive unit 130 may have various shapes, so long as it can rotate the barrel cam 140. For example, the drive unit 130 includes a gear 131 coupled to one end of the barrel cam 140, and a drive motor 135 coupled to the gear 131 to drive the gear 131. Since the barrel cam 140 is rotated by the gear 131, the rotating angle of the mirror link 150 may be accurately controlled by precisely adjusting the rotating angle of the barrel cam 140.

The gear 131 includes a worm gear 132 which is axially coupled to the drive motor 135, and a worm wheel 133 which engages with the worm gear 132 and is installed on the one end of the barrel cam 140 so as to be concentric with a rotating shaft of the barrel cam 140. Since the worm wheel 133 and the worm gear 132 of the gear 131 rotate engaging with each other, the rotating torque of the drive motor 135 may be increased. Therefore, even when an external impact is transmitted to the barrel cam 140 or the gear 131, the worm wheel 133 and the worm gear 132 may be prevented from slipping from each other, whereby the rotating angle of the barrel cam 140 may be prevented from undesirably changing.

Furthermore, the drive unit 130 may be rotated in a belt driving manner. In other words, a drive pulley (not shown) may be installed on an output shaft (not shown) of the drive motor 135, a driven pulley (not shown) may be installed on the rotating shaft of the barrel cam 140, and the drive pulley and the driven pulley may be coupled to each other by a drive belt (not shown).

The barrel cam 140 is rotatably installed in the housing 120 and coupled to the drive unit 130 so that the barrel cam 140 can be rotated by the drive unit 130. A cam groove 141 is formed in the barrel cam 140 and inclined with respect to the axial direction of the barrel cam 140.

The barrel cam 140 may be formed in a cylindrical shape to have a circular outer side surface. Barrel hinges 143 protrude from respective opposite ends of the barrel cam 140 and are rotatably coupled to the housing 120. Barrel hinge holes (not shown) into which the respective barrel hinges 143 are rotatably inserted are formed in the housing 120.

The mirror link 150 is coupled to the mirror 110. When the barrel cam 140 rotates, the mirror link 150 moves along the cam groove 141 and thus rotates the mirror 110. The mirror link 150 is formed to protrude toward the drive unit 130 from the vicinity of the mirror hinge 111 provided on the one side of the mirror 110. When the barrel cam 140 rotates, the mirror link 150 slides along the cam groove 141 having an inclined shape. Thus, compared to the distance that the mirror link 150 moves along the cam groove 141, the rotating angle of the mirror link 150 is markedly reduced. Therefore, the rotating angle of the mirror link 150 may be finely changed, so that the tilting angle of the mirror 110 may be enhanced, and the resolving power of the mirror 110 may be enhanced. Since the resolving power of the mirror 110 is enhanced, the optical performance of the head-up display apparatus may be improved. Furthermore, the tilting angle of the mirror 110 may be adjusted to an appropriate angle depending on the height of a driver.

The mirror link 150 includes a link lever 151, which protrudes from a predetermined portion of the mirror 110, and to which an elastic member 160 is coupled, and a sliding protrusion 153 which protrudes from the link lever 151 to come into contact with the cam groove 141. The link lever 151 may have a linear bar shape. The sliding protrusion 153 may have a ball shape to come into line contact with the cam groove 141. Since the sliding protrusion 153 comes into line contact with the cam groove 141, a load generated by vibrations of the vehicle, acceleration, friction, etc. may be dispersed to a line contact portion. Therefore, the line contact portion of the mirror link 150 may be restricted from being worn or deformed, whereby the degree of precision in operation or the optical performance may be prevented from deteriorating.

In addition, the resolving power of the mirror 110 may be controlled by adjusting the length of the mirror link 150. For example, in the case where the length of the mirror link 150 that protrudes from the mirror 110 is increased, the rotating angle of the mirror link 150 may be reduced even when the barrel cam 140 rotates by the preset same angle. In this case, the resolving power of the mirror 110 may be enhanced. Furthermore, in the case where the length of the mirror link 150 that protrudes from the mirror 110 is reduced, the rotating angle of the mirror link 150 may be increased even when the barrel cam 140 rotates at the preset same angle. In this case, the resolving power of the mirror 110 may be reduced.

The outer side surface of the barrel cam 140 may be formed of a circular curved surface, and the cam groove 141 may be spirally formed in the outer side surface of the barrel cam 140. Since the cam groove 141 is spirally formed in the outer side surface of the barrel cam 140 having a circular curved surface, the rotating angle of the mirror link 150 relative to the rotating angle of the barrel cam 140 remains constant. Therefore, the rotating angle of the mirror link 150 may be precisely adjusted. The cam groove 141 will be described in more detail later herein.

A pair of support ribs 121 corresponding to the respective opposite ends of the barrel cam 140 are formed on the housing 120. The barrel hinges 143 are provided on the respective opposite ends of the barrel cam 140 so that the barrel hinges 143 are hinged to the respective support ribs 121. The barrel hinges 143 are disposed on the rotating center of the barrel cam 140. Since the barrel hinges 143 are reliably supported by the support ribs 121, the barrel cam 140 may be prevented from wobbling when the barrel cam 140 rotates. Consequently, the optical performance of the head-up display apparatus may be enhanced.

The head-up display apparatus further includes the elastic member 160 which is coupled to the mirror link 150 and configured to apply elastic force to the mirror link 150 so that the mirror link 150 comes into close contact with the cam groove 141. Here, the elastic member 160 is coupled to the housing 120 to pull the mirror link 150 downward. The elastic member 160 is vertically installed under the mirror link 150. The elastic member 160 may be formed of a coil spring. Since the elastic member 160 applies elastic force to the mirror link 150 so that the mirror link 150 comes into close contact with the cam groove 141, the mirror link 150 may be prevented from slipping from the cam groove 141 when the barrel cam 140 rotates. Therefore, the rotating angle of the barrel cam 140 may be accurately controlled, whereby the rotating angle of the mirror link 150 may be precisely adjusted.

The head-up display apparatus further includes a switch 170 which is installed to sense the rotating position of the mirror link 150. Since the switch 170 senses the rotating position of the mirror link 150, the rotating angle of the mirror 110 may be accurately controlled.

The switch 170 is configured to come into contact with the mirror link 150 when the mirror link 150 reaches an initial position (a position in a parking mode). The position of the mirror link 150 in the parking mode may be a position to which the mirror 110 is rotated to prevent the light of the sun from being incident on the mirror 110. Furthermore, the initial position of the mirror link 150 may be set to the same position as that in the parking mode or to a position different from that in the parking mode.

In addition, the position of the mirror link 150 (the rotating angle of the mirror 110) may be sensed using an encoder (not shown) configured to sense a rotational displacement of the drive motor 135. Alternatively, the position of the mirror link 150 may be sensed using a displacement sensor (not shown). As a further alternative, the position of the mirror link 150 may be sensed in various other ways or using various sensing units.

Figure 5:
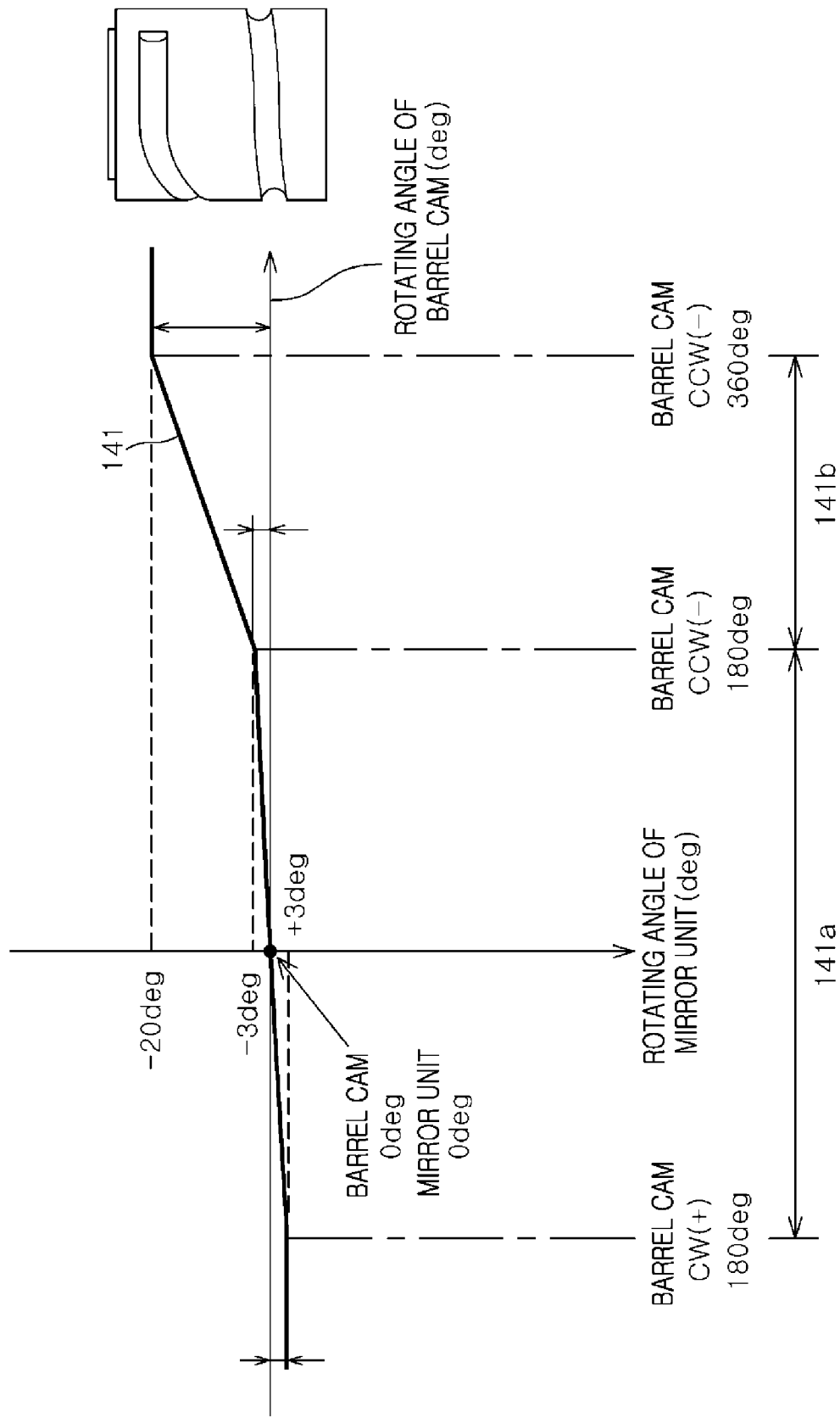
FIG. 5 is a development view illustrating a profile shape of a cam groove formed in the barrel cam of the head-up display apparatus in accordance with the embodiment of the present invention.
Figure 6:
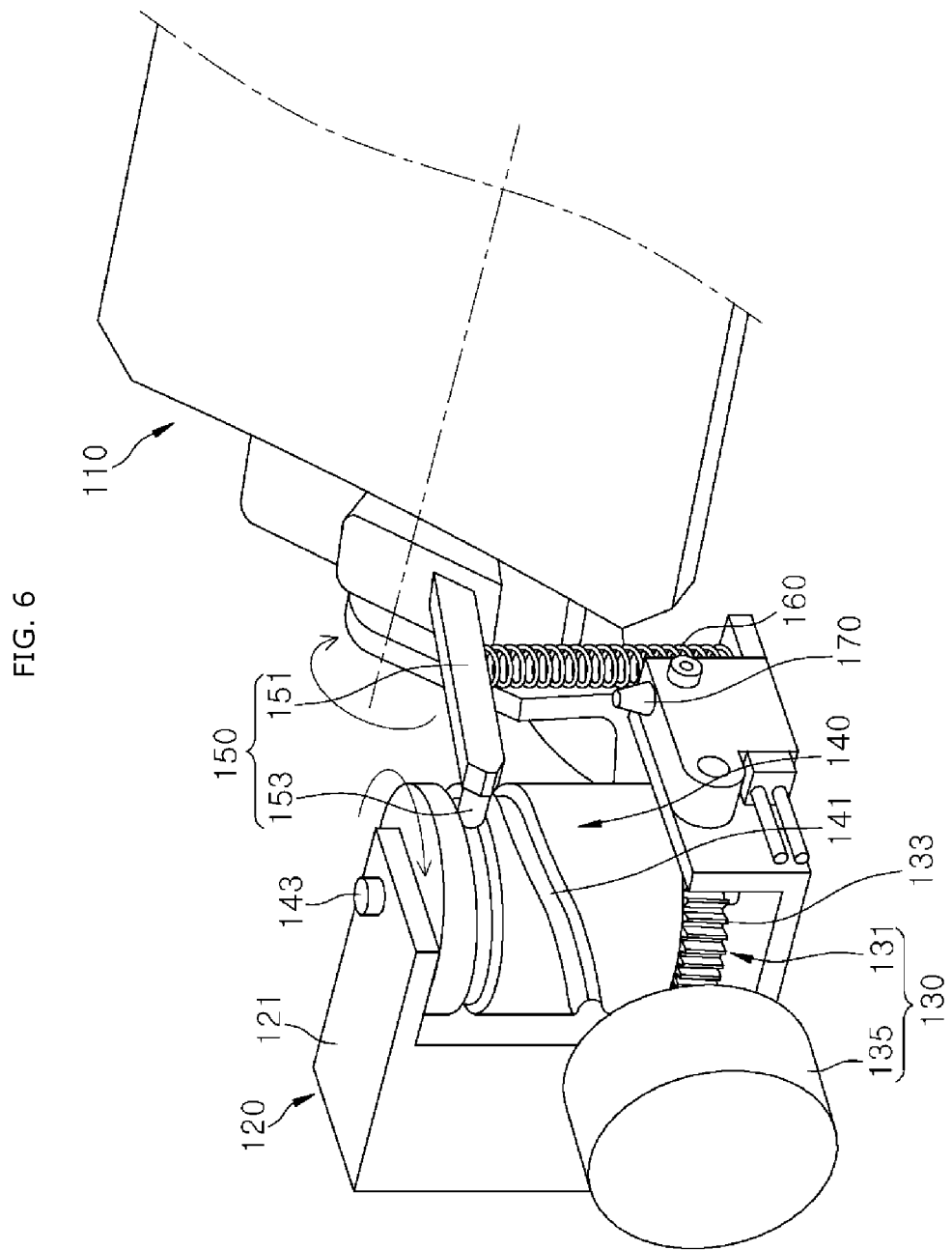
FIG. 6 is a perspective view illustrating a state in which the mirror is rotated by 3° as the barrel cam rotates by 180° in a clockwise direction, in the head-up display apparatus in accordance with the embodiment of the present invention.
Figure 7:
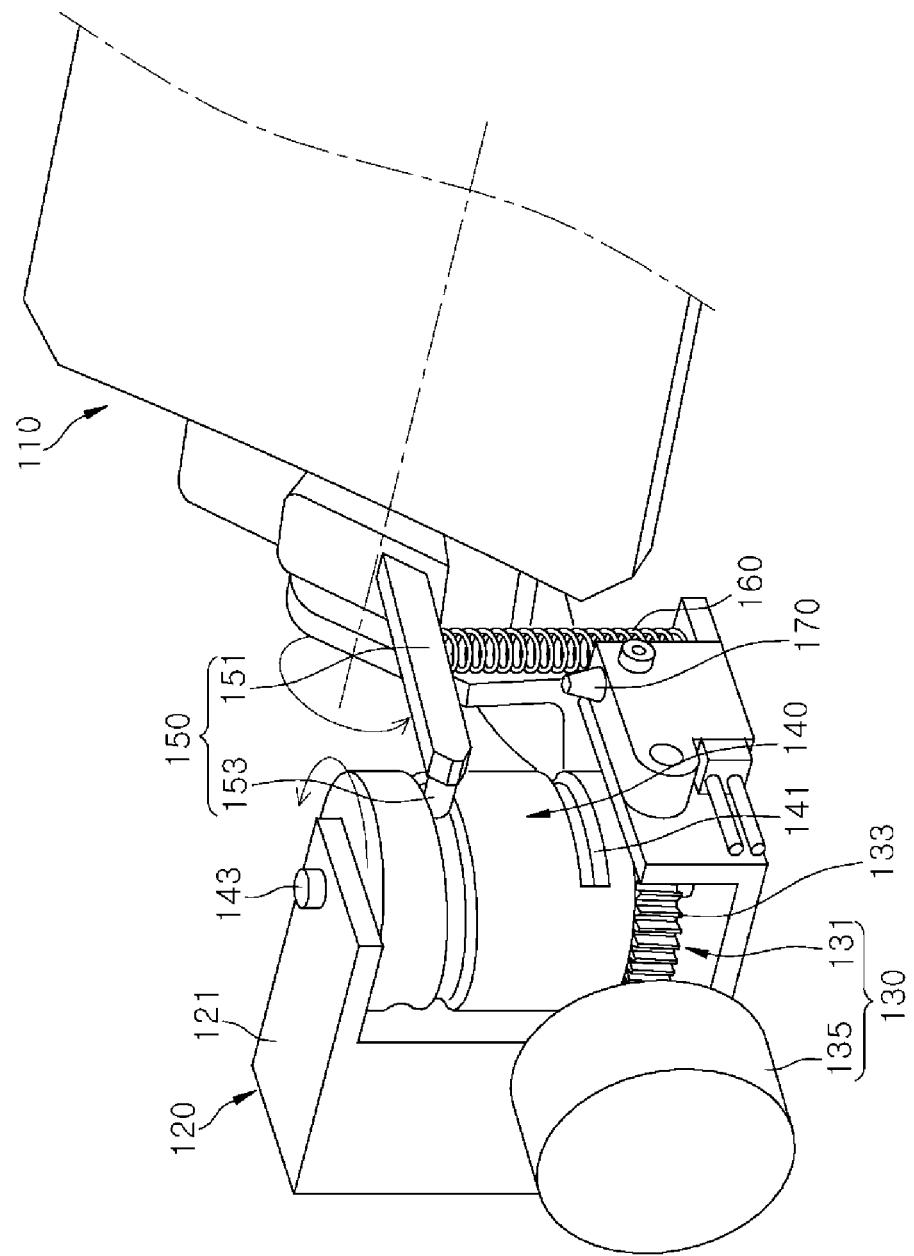
FIG. 7 is a perspective view illustrating the barrel cam and the mirror disposed at 0°, in the head-up display apparatus in accordance with the embodiment of the present invention.
Figure 8:
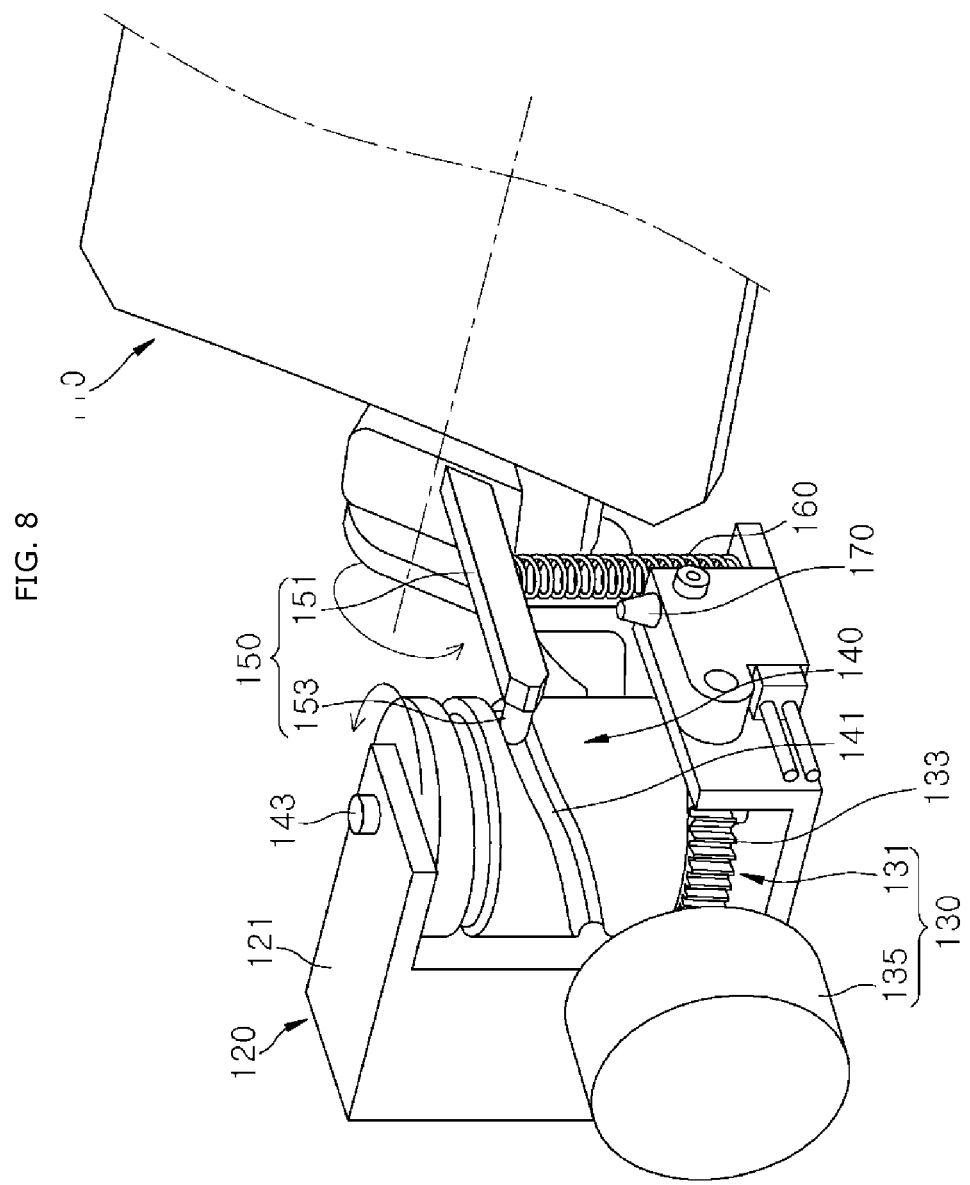
FIG. 8 is a perspective view illustrating a state in which the mirror is rotated by −3° as the barrel cam rotates by 180° in a counterclockwise direction, in the head-up display apparatus in accordance with the embodiment of the present invention.
Figure 9:
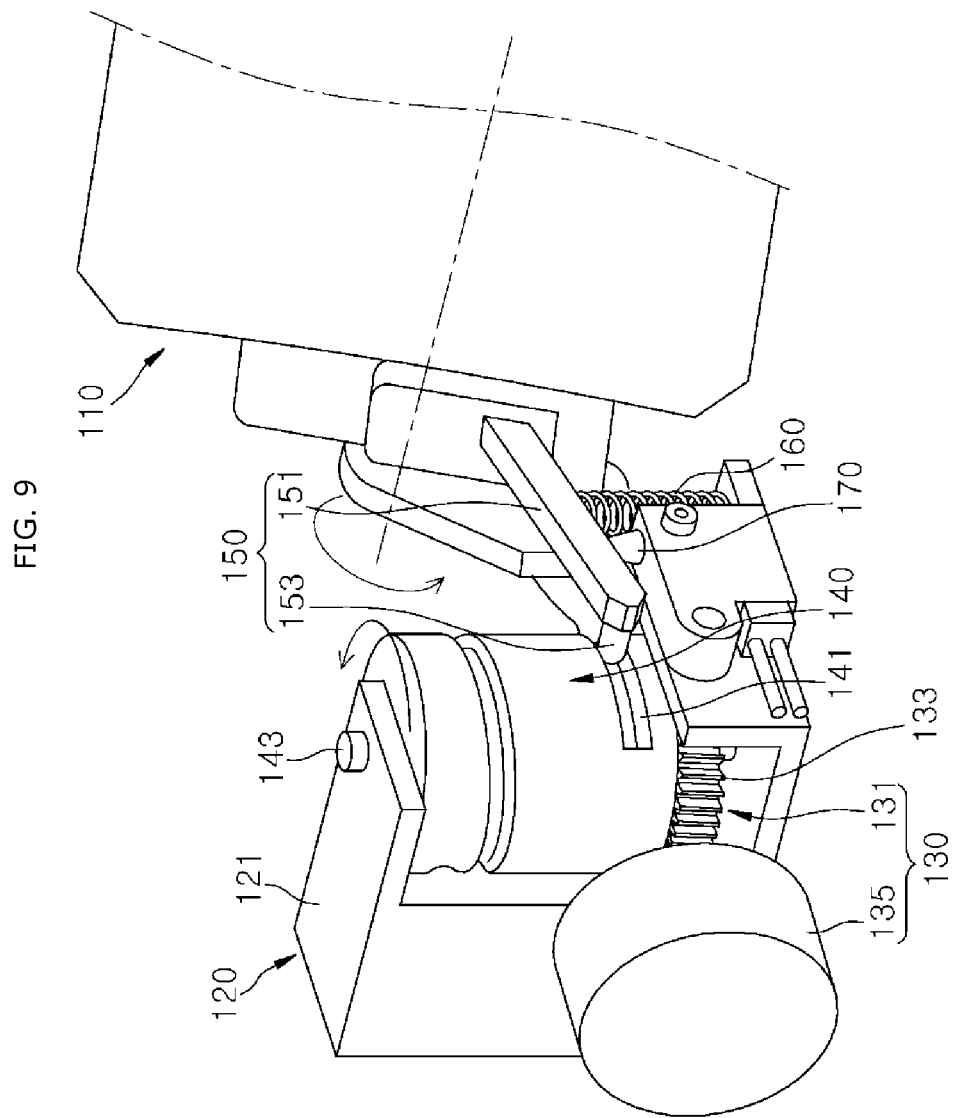
FIG. 9 is a perspective view illustrating a state in which the mirror is rotated by −20° as the barrel cam rotates by 360° in a counterclockwise direction, in the head-up display apparatus in accordance with the embodiment of the present invention.

FIG. 5 is a development view illustrating a profile shape of the cam groove formed in the barrel cam of the head-up display apparatus in accordance with the embodiment of the present invention. FIG. 6 is a perspective view illustrating a state in which the mirror is rotated by 3° as the barrel cam rotates by 180° in a clockwise direction, in the head-up display apparatus in accordance with the embodiment of the present invention. FIG. 7 is a perspective view illustrating the barrel cam and the mirror disposed at 0°, in the head-up display apparatus in accordance with the embodiment of the present invention. FIG. 8 is a perspective view illustrating a state in which the mirror is rotated by −3° as the barrel cam rotates by 180° in a counterclockwise direction, in the head-up display apparatus in accordance with the embodiment of the present invention. FIG. 9 is a perspective view illustrating a state in which the mirror is rotated by −20° as the barrel cam rotates by 360° in a counterclockwise direction, in the head-up display apparatus in accordance with the embodiment of the present invention.

Referring to FIGS. 5 to 9, the cam groove 141 includes a first profile section 141a formed to adjust the tilting angle of the mirror 110, and a second profile section 141b which is coupled to the first profile section 141a and has an inclination angle greater than that of the first profile section 141a. The inclination angles of the first and second profile sections 141a and 141b may mean inclination angles relative to the rotating axis of the barrel cam 140.

An example of the first profile section 141a and the second profile section 141b is as follows.

The first profile section 141a may be a section between a point at which the barrel cam 140 rotates by 180° in the clockwise direction and the mirror 110 rotates by 3° (refer to FIGS. 5 and 6), and a point at which the barrel cam 140 rotates by 180° in the counterclockwise direction and the mirror 110 rotates by −3° (refer to FIGS. 5 and 8). The first profile section 141a may form a constant inclination angle and have a symmetric structure, based on a point at which the barrel cam 140 and the mirror 110 rotate by 0° (refer to FIGS. 5 and 7).

The second profile section 141b may be a section between a point at which the barrel cam 140 rotates by 180° in the counterclockwise direction and the mirror 110 rotates by −3° (refer to FIGS. 5 and 8), and a point at which the barrel cam 140 rotates by 360° in the counterclockwise direction and the mirror 110 rotates by −20° (refer to FIGS. 5 and 9). The second profile section 141b may have an inclination angle greater than that of the first profile section 141a.

Since the first profile section 141a has a gentle inclination angle compared to that of the second profile section 141b, the speed at which the mirror 110 rotates is comparatively low when the mirror link 150 moves along the first profile section 141a. Therefore, when the mirror link 150 rotates along the first profile section 141a, the tilting angle of the mirror 110 may be finely adjusted, whereby the resolving power may be enhanced.

Furthermore, since the inclination angle of the second profile section 141b is greater than the inclination angle of the first profile section 141a, the speed at which the mirror link 150 moves when the mirror link 150 moves along the second profile section 141b may be greater than that when the mirror link 150 moves along the first profile section 141a. Therefore, when the mirror link 150 moves along the second profile section 141b, the mirror 110 rotates at a comparatively high speed. Consequently, the mirror 110 may be rapidly rotated to an angle at which the light of the sun is prevented from being incident on the mirror 110.

As such, in the cam groove 141, the inclination angle of the second profile section 141b is greater than that of the first profile section 141a. Hence, when there is a need to adjust the angle of the mirror 110, the angle of the mirror 110 may be finely adjusted so that the resolving power may be enhanced. When the mirror 110 enters the parking mode, the rotating speed of the mirror 110 may be increased.

Furthermore, there may be a difference in eye level of drivers due to a difference in height of the drivers. In the present invention, the tilting angle of the mirror 110 may be adjusted to a value suitable for the eye level of each driver. For example, when the mirror 110 is 0°, it may be suitable for a driver having an average height, i.e., having a normal eye level (refer to FIG. 7). When the mirror 110 is 3°, it may be suitable for a driver having a height greater than the average height, i.e., having an eye level greater than the normal eye level (refer to FIG. 6). When the mirror 110 is −3°, it may be suitable for a driver having a height less than the average height, i.e., having an eye level less than the normal eye level (refer to FIG. 8). Furthermore, when the mirror 110 is −20°, it may correspond to the case where the mirror 110 is disposed at a position to prevent it from having a sunburn due to external rays (refer to FIG. 9).

The resolving power of the mirror 110 may be adjusted by changing the inclination angle of the first profile section 141a. For example, in the case where the inclination angle of the first profile section 141a is increased, the rotating angle of the mirror link 150 may be increased even if the barrel cam 140 rotates at the same angle. In this case, the resolving power of the mirror 110 may be reduced. Furthermore, in the case where the inclination angle of the first profile section 141a is reduced, the rotating angle of the mirror link 150 may be reduced even if the barrel cam 140 rotates at the same angle. In this case, the resolving power of the mirror 110 may be increased.

Furthermore, as the inclination angle of the second profile section 141b is changed, the rotating speed of the mirror 110 may be adjusted when it enters the parking mode. For example, in the case where the inclination angle of the second profile section 141b is increased, the rotating speed of the mirror link 150 may be increased even if the barrel cam 140 rotates at the preset same angle. In this case, the rotating speed of the mirror 110 may be increased. Furthermore, in the case where the inclination angle of the second profile section 141b is reduced, the rotating speed of the mirror link 150 may be reduced even if the barrel cam 140 rotates at the preset same angle. In this case, the rotating speed of the mirror 110 may be reduced.

As described above, when the barrel cam 140 rotates, the mirror link 150 slides along the cam groove 141 having an inclined shape. Thus, the rotating angle of the mirror link 150 may be finely changed. Therefore, the degree of precision of the tilting angle of the mirror 110 may be enhanced, and the resolving power of the mirror 110 may be enhanced. Furthermore, since the resolving power of the mirror 110 is enhanced, the optical performance of the head-up display apparatus may be improved.

In addition, since the cam groove 141 is spirally formed in the outer side surface of the barrel cam 140 having a circular curved surface, the rotating angle of the mirror link 150 relative to the rotating angle of the barrel cam 140 remains constant. Therefore, the tilting angle of the mirror 110 may be precisely adjusted.

Moreover, since the elastic member 160 applies elastic force to the mirror link 150 so that the mirror link 150 comes into close contact with the cam groove 141, the mirror link 150 may be prevented from slipping from the cam groove 141 when the barrel cam 140 rotates. Therefore, the rotating angle of the barrel cam 140 may be accurately controlled, whereby the tilting angle of the mirror link 150 may be precisely adjusted.

Because the sliding protrusion 153 comes into line contact with the cam groove 141, a load generated by vibrations of the vehicle, acceleration, friction, etc. may be dispersed to a line contact portion. Therefore, the line contact portion of the mirror link 150 may be restricted from being worn or deformed, whereby the degree of precision in operation or the optical performance may be prevented from deteriorating.

While the present invention has been described with respect to the specific embodiments illustrated in the attached drawings, these are only for illustrative purposes, and it will be apparent to those skilled in the art that various changes and modifications may be made without departing from the spirit and scope of the invention as defined in the following claims.

Therefore, the spirit and scope of the present invention must be defined by the accompanying claims.

What is claimed is:

1. A head-up display apparatus comprising:
    a mirror;
    a housing disposed on one side of the mirror;
    a drive unit disposed in the housing;
    a barrel cam rotatably disposed in the housing and coupled to the drive unit, the drive unit configured to rotate the barrel cam, with a cam groove formed on the barrel cam and extending along an axial direction of the barrel cam; and
    a mirror link coupled to the mirror, and configured to rotate the mirror by moving along the cam groove when the barrel cam rotates.

2. The head-up display apparatus according to claim 1, wherein an outer side surface of the barrel cam is a circular curved surface, and
    wherein the cam groove is spirally formed on the outer side surface of the barrel cam.

3. The head-up display apparatus according to claim 2, wherein the cam groove comprises:
    a first profile section configured to adjust a tilting angle of the mirror; and
    a second profile section coupled to the first profile section, and having an inclination s angle greater than an inclination angle of the first profile section.

4. The head-up display apparatus according to claim 2, wherein a pair of support ribs are disposed on the housing to face respective opposite ends of the barrel cam, and
    wherein barrel hinges are disposed on the respective opposite ends of the barrel cam and hinged to the corresponding support ribs.

5. The head-up display apparatus according to claim 1, wherein the drive unit comprises:
    a gear coupled to one end of the barrel cam; and
    a drive motor coupled to the gear to drive the gear.

6. The head-up display apparatus according to claim 5, wherein the gear comprises:
    a worm gear axially coupled to the drive motor; and
    a worm wheel engaging with the worm gear, and disposed on the one end of the barrel cam to be concentric with a rotating axis of the barrel cam.

7. The head-up display apparatus according to claim 1, further comprising an elastic member coupled to the mirror link and configured to apply elastic force to the mirror link to maintain a contact between the mirror link and the cam groove.

8. The head-up display apparatus according to claim 7, wherein the elastic member is coupled to the housing and configured to pull the mirror link downward.

9. The head-up display apparatus according to claim 7, wherein the mirror link comprises:
    a link lever protruding from a predetermined portion of the mirror and coupled with the elastic member; and
    a sliding protrusion protruding from the link lever and coming into line contact with the cam groove.

10. The head-up display apparatus according to claim 1, further comprising a switch disposed to sense a rotating position of the mirror link.

11. The head-up display apparatus according to claim 10, wherein the switch is configured to come into contact with the mirror link when the mirror link reaches an initial position.

\* \* \* \* \*